(12) United States Patent
Eschbach et al.

(10) Patent No.: US 7,201,637 B2
(45) Date of Patent: Apr. 10, 2007

(54) SIMULTANEOUS PLANARIZATION OF POLE PIECE AND COIL MATERIALS FOR WRITE HEAD APPLICATIONS

(75) Inventors: Florence Eschbach, Portolla Valley, CA (US); Eric James Lee, San Jose, CA (US); Peter Beverley Powell Phipps, Saratoga, CA (US); Amanda Baer, Campbell, CA (US); Edward Hin Pong Lee, San Jose, CA (US); Francisco Martin, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/313,070

(22) Filed: Dec. 20, 2005

(65) Prior Publication Data
US 2006/0099890 A1    May 11, 2006

(51) Int. Cl.
 *B24B 1/00* (2006.01)
 *G11B 5/127* (2006.01)
(52) U.S. Cl. .............. 451/28; 360/313; 29/603.16
(58) Field of Classification Search ........... 451/41, 451/28; 360/123, 125, 126, 317, 320, 313, 360/318; 29/603.16, 603.07
See application file for complete search history.

(56) References Cited

U.S. PATENT DOCUMENTS

| 4,544,376 A | 10/1985 | Duran ..................... 51/293 |
| 4,677,036 A | 6/1987 | Nakamura et al. ......... 428/694 |
| 4,933,209 A | 6/1990 | Anthony et al. ............ 427/116 |
| 5,264,010 A | 11/1993 | Brancaleoni et al. ........ 51/308 |
| 5,465,475 A | 11/1995 | Kinoshita et al. ........... 29/603 |
| 5,890,278 A | 4/1999 | Van Kesteren ........... 29/603.14 |
| 5,940,956 A | 8/1999 | Jordan ..................... 29/603.16 |
| 5,954,997 A | 9/1999 | Kaufman et al. .......... 252/79.1 |
| 6,024,886 A | 2/2000 | Han et al. ................ 216/38 |
| 6,032,353 A | 3/2000 | Hiner et al. ............. 29/603.14 |
| 6,063,306 A | 5/2000 | Kaufman et al. .......... 252/79.4 |
| 6,076,256 A | 6/2000 | Drake et al. .............. 29/825 |
| 6,093,333 A | 7/2000 | Phipps .................. 216/22 |
| 6,099,604 A | 8/2000 | Sandhu et al. .............. 51/307 |
| 6,105,238 A | 8/2000 | Chesnutt et al. ......... 29/603.14 |

(Continued)

FOREIGN PATENT DOCUMENTS

| JP | 60177420 | 9/1985 |
| JP | 63117307 | 5/1988 |
| JP | 11302636 | 11/1999 |
| WO | WO99/47618 | 9/1999 |

OTHER PUBLICATIONS

IBM TDB, v. 38, n. 3, Mar. 1995, p. 37.

(Continued)

*Primary Examiner*—Jacob K. Ackun, Jr.
(74) *Attorney, Agent, or Firm*—Walter W. Duft

(57) ABSTRACT

A method for simultaneously planarizing to relatively equal smoothness a thin film magnetic head hardbaked resist structure having relatively low surface energy and one or more additional thin film magnetic head structures containing other materials having comparatively higher surface energy, such as copper, hardbaked resist, alumina and NiFe. The method begins with preparation of a chemical mechanical polishing (CMP) slurry targeted at equaling the removal rate of the materials to be planarized. The CMP slurry includes a liquid vehicle, an abrasive, and a surfactant. The CMP slurry is applied to the surface of the structures to be planarized and the structures are simultaneously planarized using a CMP planarization technique.

20 Claims, 6 Drawing Sheets

U.S. PATENT DOCUMENTS

| | | | |
|---|---|---|---|
| 6,324,036 B1* | 11/2001 | Dill, Jr. et al. | 360/320 |
| 6,554,878 B1 | 4/2003 | Dill, Jr. et al. | 51/308 |
| 2002/0030928 A1* | 3/2002 | Hsiao et al. | 360/123 |
| 2002/0084243 A1 | 7/2002 | Hsiao et al. | 216/13 |
| 2002/0191334 A1* | 12/2002 | Hsu et al. | 360/123 |
| 2006/0099890 A1* | 5/2006 | Eschbach et al. | 451/41 |

OTHER PUBLICATIONS

J. Vac. Sci. Tech. B 18(1) Jan./Feb. 2000, pp. 201-207.

Thin Solid Films 290-291 (1966), pp. 447-452.

Geetha Ramachandran et al., "A P2P Intrusion Detection System Based on Mobile Agents," ACME, Apr. 2004, pp. 185-190.

Deborah Frincke, "Balancing Cooperation and Risk in Intrusion Detection," ACM Transactions on Information and Systems Security vol. 3, No. 1, Feb. 2000, pp. 1-20.

Leonard J. LaPadula, "State of the Art in CyberSecurity Monitoring," MITRE Center for Integrated Intelligence Systems, 2001, pp. i, iii, 1-15.

* cited by examiner

SIMULTANEOUS PLANARIZATION OF POLE PIECE AND COIL MATERIALS FOR WRITE HEAD APPLICATIONS

BACKGROUND OF THE INVENTION

1. Field of the Invention

The present invention relates to thin film heads for magnetically writing information on data storage media, and particularly to fabrication processes for manufacturing such heads. Still more particularly, the invention concerns the planarization of device layer surfaces in thin film magnetic write heads using chemical mechanical polishing techniques.

2. Description of the Prior Art

By way of background, thin film magnetic write heads conventionally include a P2 pole piece having a sloping surface that extends toward the pole tip area where the head's write gap is located. An example of this conventional geometry is shown in the FIG. 1, which illustrates a side view of a prior art write head 2 in which the ABS (Air Bearing Surface) of the head is on the right side of the figure. The P2 pole piece 4 lies over an integrated layer 6 containing plural copper coils 8 surrounded by insulative hard bake resist material 10. Conventional plating techniques are used to form the P2 pole piece 4 over the integrated layer 6. In particular, after a suitable photoresist mask pattern is applied to define the required P2 yoke configuration, a ferromagnetic material such as an Ni—Fe alloy (permalloy) is plated from a liquid or gaseous medium or deposited using any known deposition method. A disadvantage of this technique is that the ill-defined slope 12 of the integrated layer 6 as it approaches the pole tip 14 makes it difficult to control the geometry of the P2 photoresist mask. In addition, the application of P2 material onto the integrated layer's sloped surface can produce a P2 layer having non-uniform thickness and varying ferromagnetic properties. A further disadvantage is that write head track width is difficult to control. Each of the foregoing problems may be present to different degrees in any given write head of a single fabrication batch, or between write heads produced in different fabrication batches. This makes repeatability of results difficult to achieve and reduces production yields accordingly.

As a solution to the foregoing design problem, applicants' assignee previously developed a write head design in which the sloping P2 pole layer of the prior art write head is replaced with a combined P2/P3 structure that has no sloping surfaces. One example of this design approach is shown in FIG. 2, which illustrates an improved write head 20 in which the ABS is on the left side of the figure. The write head 20 includes a P1 pole layer 22 covered by an integrated layer 24 containing plural copper coils 26 surrounded by insulative hard bake resist material 28. After a first alumina dielectric layer 30 is added, a combined P2/P3 pole piece 32 is formed. Initially, only a pair of small P2 stubs 34a and 34b are placed at the write head back gap and at the P2 pole tip, respectively. After applying and patterning a second alumina dielectric layer 36, a horizontal P3 pole piece 38 is added to magnetically interconnect the P2 stubs 34a and 34b. Note that the device layers below the P1 pole layer 22 are conventional in nature and are collectively referred to in the drawing figures as "other structure" for convenience.

It has been determined that the most preferred approach to fabricating the write head 20 would be to utilize a CMP (Chemical Mechanical Polishing) planarization step prior to deposition of the second alumina dielectric layer 36 and the P3 pole piece 38. In particular, after formation of the copper coils 26, the hardbaked resist material 28, the first alumina dielectric layer 30, and the NiFe P2 stubs 34a/34b, these structures should be planarized to provide a flat horizontal surface onto which the second alumina dielectric layer 36 and the P3 pole piece 38 can be applied.

CMP is a known technique for planarizing various structures on a thin film substrate. The process creates a smooth planar surface for optimal lithographic processing steps of the intermediate thin film fabrication process. CMP planarization processing is used not only to planarize protruding surfaces, but also to remove undesirable residues that remain from other substrate processing steps.

The difficulty with using CMP planarization for the improved write head application described above is that current CMP methods will not polish away the four involved materials (copper, hardbaked resist, alumina and NiFe) at the same rate. These materials are removed at different rates, resulting in an uneven surface profile, particularly between the hardbaked resist and copper structures, and between the hardbaked resist and alumina structures.

Accordingly, an improved CMP planarization method is required if improvements in the fabrication of the above-described write head design are to be achieved. What is needed is a new CMP planarization process wherein a structure comprising copper, hardbaked resist, alumina and NiFe can be simultaneously polished in a way that facilitates more equal removal of the materials being planarized.

SUMMARY OF THE INVENTION

The foregoing problems are solved and an advance in the art is obtained by a novel CMP planarization method using an improved CMP slurry whose chemistry is targeted to facilitate improved equalization of copper, hardbaked resist, alumina and NiFe removal rates. More generally, the slurry can be targeted for any thin film magnetic head planarization process wherein hardbaked resist having relatively low surface energy is simultaneously planarized with other materials having comparatively higher surface energy. The CMP slurry includes a liquid vehicle containing an oxidant and a complexing agent, an abrasive, and a surfactant. It is applied to the surface of the copper, hardbaked resist, alumina and NiFe structures, and these structures are simultaneously planarized using a CMP planarization technique.

Exemplary surfactants include non-ionic surfactants such as octylphenoxypolyethoxyethanol, polyoxyethylene glycol, and the like, as well as anionic, cationic and ambipolar (amphoteric) surfactants. Exemplary slurries can be formulated with a surfactant concentration of between about 0.02–1.0% (by volume), and more preferably at least about 0.2% (by volume), and most preferably about 0.5% (by volume). The abrasive may comprise silica, alumina, cerium oxide or any other suitable abrasive material. Exemplary slurries can be formulated with an abrasive concentration of about 3–30% (by volume), and more preferably about 6–12% (by volume) and most preferably about 9% (by volume). The liquid vehicle may comprise an aqueous solution containing a quantity of a compound that provides both the oxidant and the complexing agent, such as ammonium persulfate or the like. A separately added oxidant (e.g., hydrogen peroxide, sodium persulfate, etc.) and a separately added complexing agent (e.g., ammonium carbonate) may also be used. Exemplary slurries can be formulated with an oxidant/complexing agent concentration of about 1.5–3 grams/liter and a slurry pH level ranging from about 6–10.5. If the oxidant/complexing agent is ammonium persulfate, with the ammonium providing the complexing agent and the persulfate providing the oxidant, the preferred concentration of 1.5–3 grams/liter will produce an ammonium complexing agent concentration of about 237–474 ppm. Most preferred is an ammonium concentration of about 300 ppm and a slurry pH level of about 8.5–10.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED
EMBODIMENTS

Figure 1:
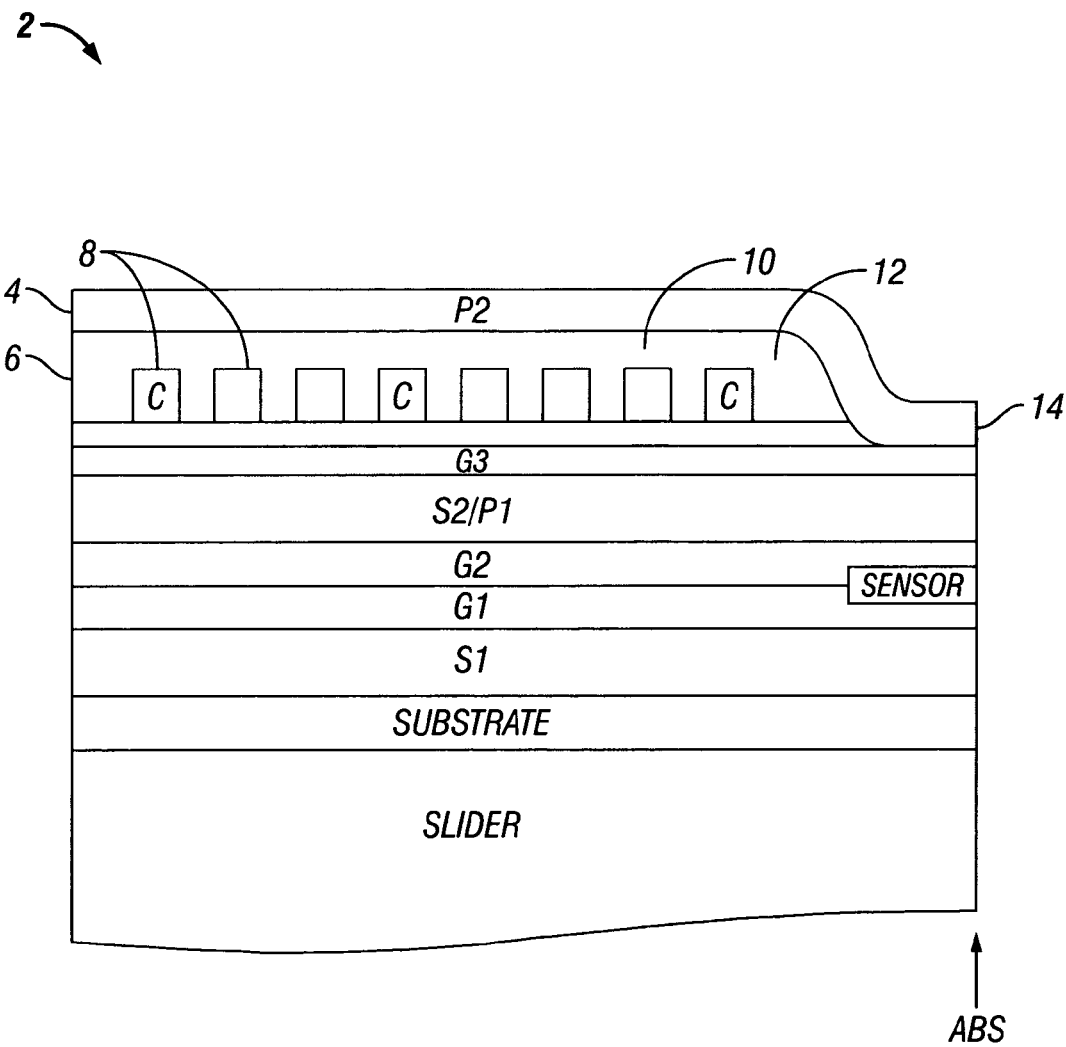
FIG. 1 is a vertical side sectional view of a prior art integrated read/write head wherein the write head incorporates a conventional P2 pole layer with a sloping surface extending to the pole tip.
Figure 2:
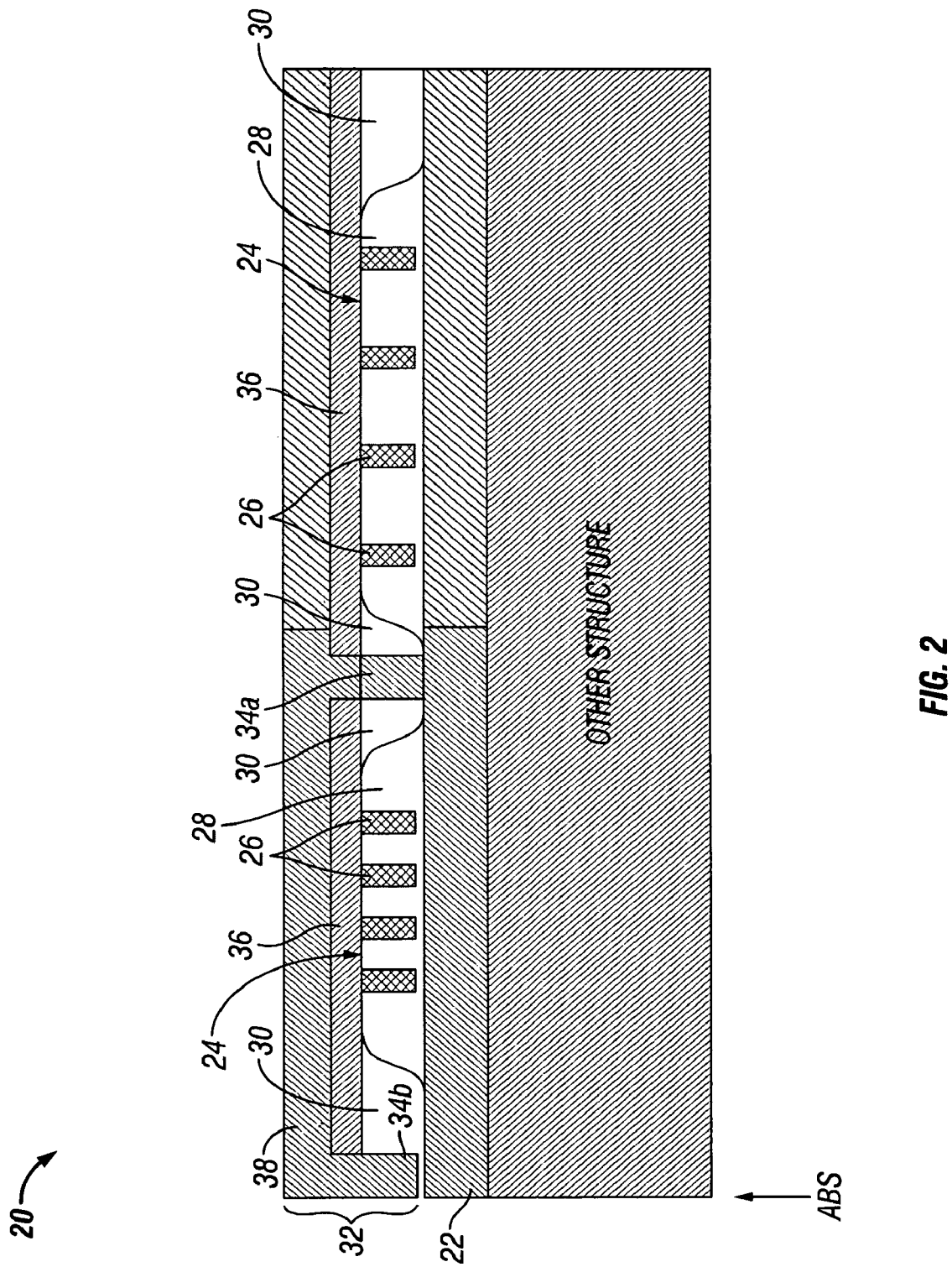
FIG. 2 is a vertical side sectional view of an improved design for a write head that incorporates a combined P2/P3 pole layer with no sloping surfaces.
Figure 3:
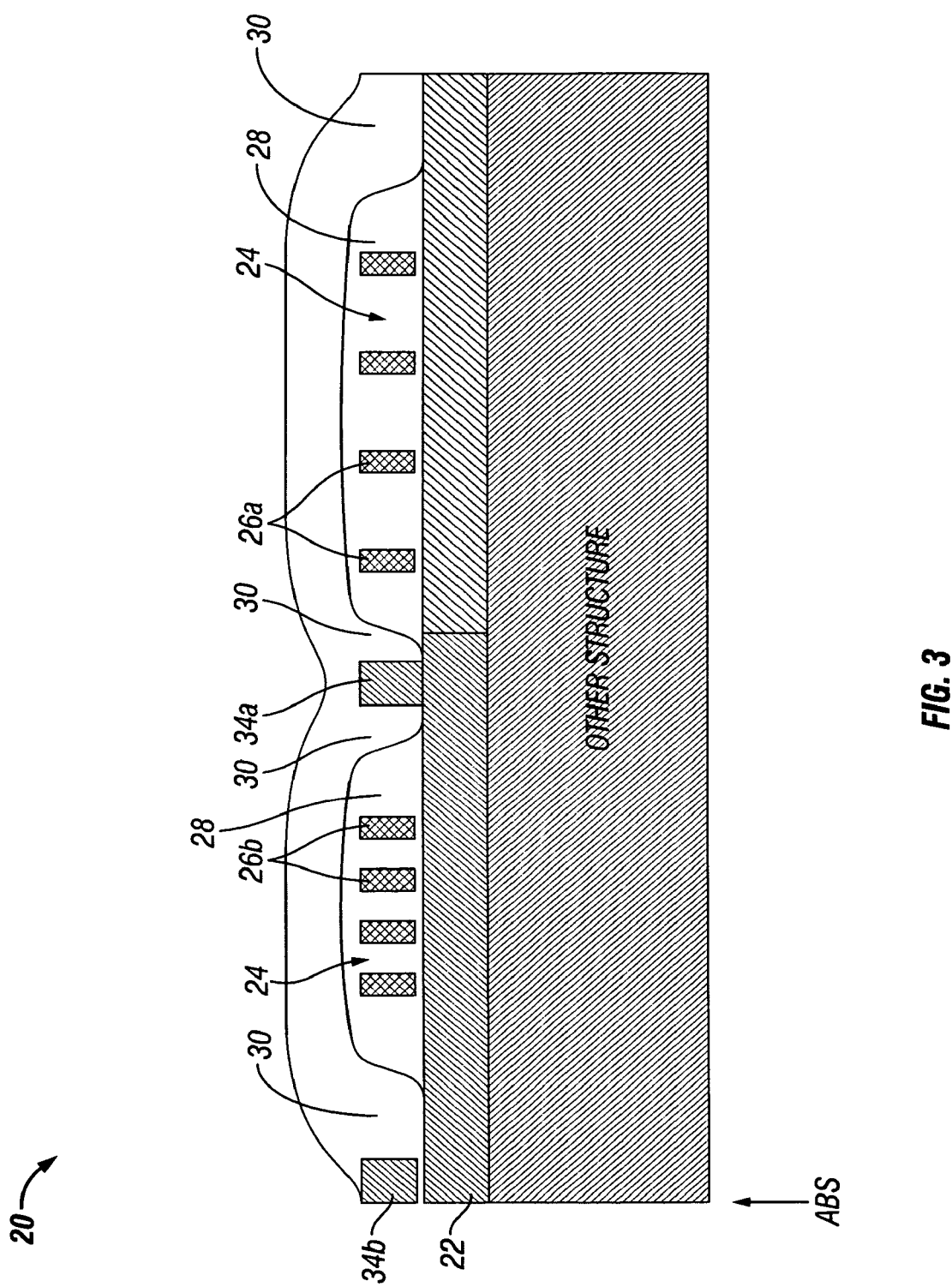
FIG. 3 is a vertical side sectional view of the write head of FIG. 2 prior to CMP planarization of the P2 poles, the first alumina dielectric layer, the copper coils and the hardbaked resist insulative layer.
Figure 4:
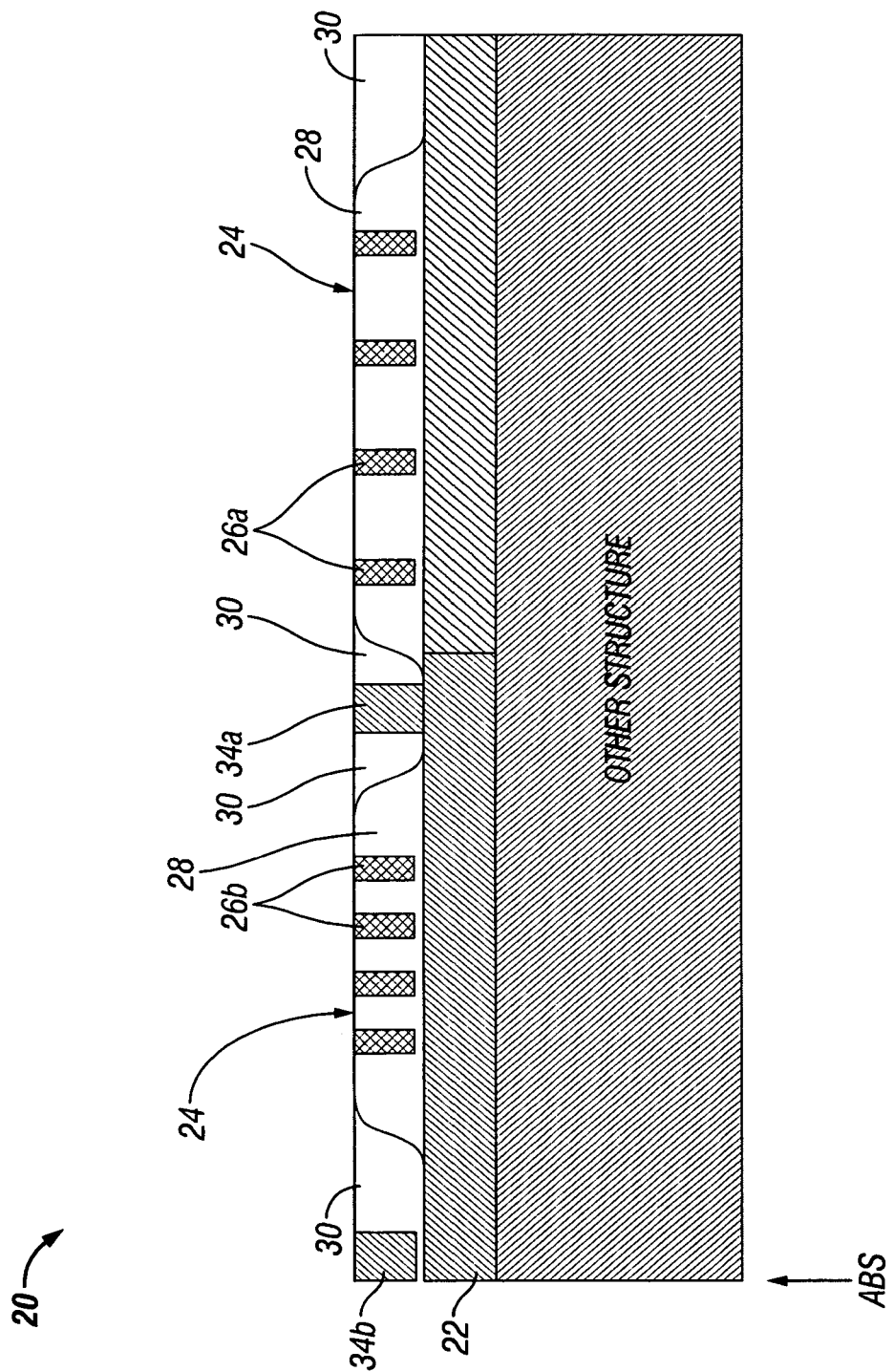
FIG. 4 is a vertical side sectional view of the write head of FIG. 3 following CMP planarization of the P2 poles, the first alumina dielectric layer, the copper coils and the hardbaked resist insulation material.

Turning now to the figures, wherein like reference numerals represent like elements in all of the several views, FIGS. 3 and 4 respectively illustrate the write head of FIG. 2 (described by way of background above) prior to and following CMP planarization of the P2 poles, the first alumina dielectric layer, the copper coils and the hardbaked resist insulative material. In FIG. 3, the P1 pole 22 supports the integrated layer 24 containing the plural copper coils 26 (which are shown to include wide pitch coils 26*a* and narrow pitch coils 26*b*), the insulative hardbaked resist material 28, the first alumina dielectric layer 30 and the NiFe back gap and pole tip P2 stubs respectively designated by reference numerals 34*a* and 34*b*. The copper coils 26 are typically applied first, followed by the hardbaked resist material 28. The P2 stubs 34*a* and 34*b* are then deposited and the entire structure is covered with the first alumina dielectric layer 30.

Following deposition of the foregoing materials, CMP planarization is performed. The planarization process initially involves only removal of the first alumina dielectric layer 30, which lies above all the other structures. After a sufficient amount of the first alumina dielectric layer 30 is removed, the planarization process reaches the insulative hardbaked resist material 24 and thereafter exposes the copper coils 26 and the NiFe P2 stubs 34*a* and 34*b*. At this point, further planarization involves the simultaneous removal of copper, hardbaked resist, alumina and NiFe until the desired structural height of the NiFe P2 stubs 34*a* and 34*b* is reached, as shown in FIG. 4.

Applicants have discovered that simultaneous CMP planarization as well as photolithography of the foregoing materials and structures can be greatly enhanced by targeting the CMP slurry chemistry to equalize the copper, hardbaked resist, alumina and NiFe removal rates. More generally, the slurry can be targeted for any thin film magnetic head planarization process wherein hardbaked resist, which has relatively low surface energy, is simultaneously planarized with one or more materials having comparatively higher surface energy, such as one or more magnetic head structures comprising copper, alumina or NiFe. A preferred CMP slurry that satisfies the foregoing requirements will include a liquid vehicle containing an oxidant and a complexing agent, an abrasive, and a surfactant present in an amount sufficient to enhance the surface wetability of the hardbaked resist without impairing the overall polishing characteristics of the slurry.

Taking the slurry components in reverse order, exemplary surfactants include non-ionic surfactants, anionic surfactants (for high pH slurries), cationic surfactants (for low pH slurries) and ambipolar (amphoteric) surfactants. The non-ionic surfactant octylphenoxypolyethoxyethanol has been found to perform satisfactorily in a CMP slurry comprising an aqueous carrying vehicle containing an oxidant and a complexing agent, and an abrasive selected to remove the alumina and oxidized copper and NiFe. Exemplary slurries can be formulated with a surfactant concentration of between about 0.02–1.0% (by volume), and more preferably at least about 0.2% (by volume), and most preferably about 0.5% (by volume).

The abrasive may comprise silica, alumina, cerium oxide or any other suitable abrasive material. Exemplary slurries can be formulated with an abrasive concentration of about 3–30% (by volume), and more preferably about 6–12% (by volume) and most preferably about 9% (by volume). Generally speaking, excessive abrasive will remove too much alumina while insufficient abrasive will result in an inadequate material removal rate. Persons skilled in the art will appreciate that the final concentration of abrasive should be selected to optimize the planarization process given these competing considerations.

The liquid vehicle may comprise an aqueous solution containing a quantity of a compound that provides both the oxidant and the complexing agent, such as ammonium persulfate or the like. A separately added oxidant (e.g., hydrogen peroxide, sodium persulfate, etc.) and a separately added complexing agent (e.g., ammonium carbonate) may also be used. For example, commonly assigned application Ser. No. 09/332,490, filed Jun. 14, 1999, shows the separate addition of sodium persulfate and ammonium carbonate to a CMP slurry. Exemplary slurries can be formulated with an oxidant/complexing agent concentration of about 1.5–3 grams/liter and a slurry pH level ranging from about 6–10.5. If the oxidant/complexing agent is ammonium persulfate, with the ammonium providing the complexing agent and the persulfate providing the oxidant, the preferred concentration of about 1.5–3 grams/liter will produce an ammonium concentration of about 237–474 ppm. Most preferred is an ammonium concentration of about 300 ppm and a slurry pH level of about 8.5–10. Generally speaking, excessive oxidant/complexing agent will oxidize too much copper and NiFe while insufficient oxidant/complexing agent will result in an inadequate metal removal rate. As in the case of the abrasive, persons skilled in the art will appreciate that the final concentration of oxidant/complexing agent should be selected to optimize the planarization process given these competing considerations. It should be noted that the required amount of oxidant/complexing agent also depends on the amount of abrasive in the slurry and the slurry pH level. Relative to the latter parameter, if the oxidant/complexing agent is ammonium persulfate, the pH affects the fraction thereof that is converted to ammonium, with higher pH causing more ammonium conversion and lower pH causing less ammonium conversion.

In general, the production of an optimal CMP slurry according to the invention will involve choosing a parameter such as surfactant concentration, abrasive content, pH level or oxidant/complexing agent concentration within the ranges specified above. Once one of the parameters has been chosen, the slurry that provides the best planarization can be approached by adjusting the other parameters to give equal rates of removal for each material to be removed.

An exemplary octylphenoxypolyethoxyethanol surfactant that may be used in a CMP slurry according to the invention is sold under the registered trademark TRITON® X100 by Rohm & Haas Corporation. Adding TRITON® X100 surfactant to the slurry at a concentration of between about 0.2–0.5% (by volume) has been found to dramatically improve planarization results when compared to slurries that do not include a surfactant. Most preferred is a surfactant concentration of about 0.5% (by volume) in a slurry that comprises water, about 9% of a silica abrasive agent having a particle size of less than about 1000 Angstroms, and about 2–3 grams/liter of ammonium persulfate ($(NH_4)_2SO_8$) to provide the desired ammonium concentration of about 237–474 ppm, and the persulfate oxidant.

Figure 5:
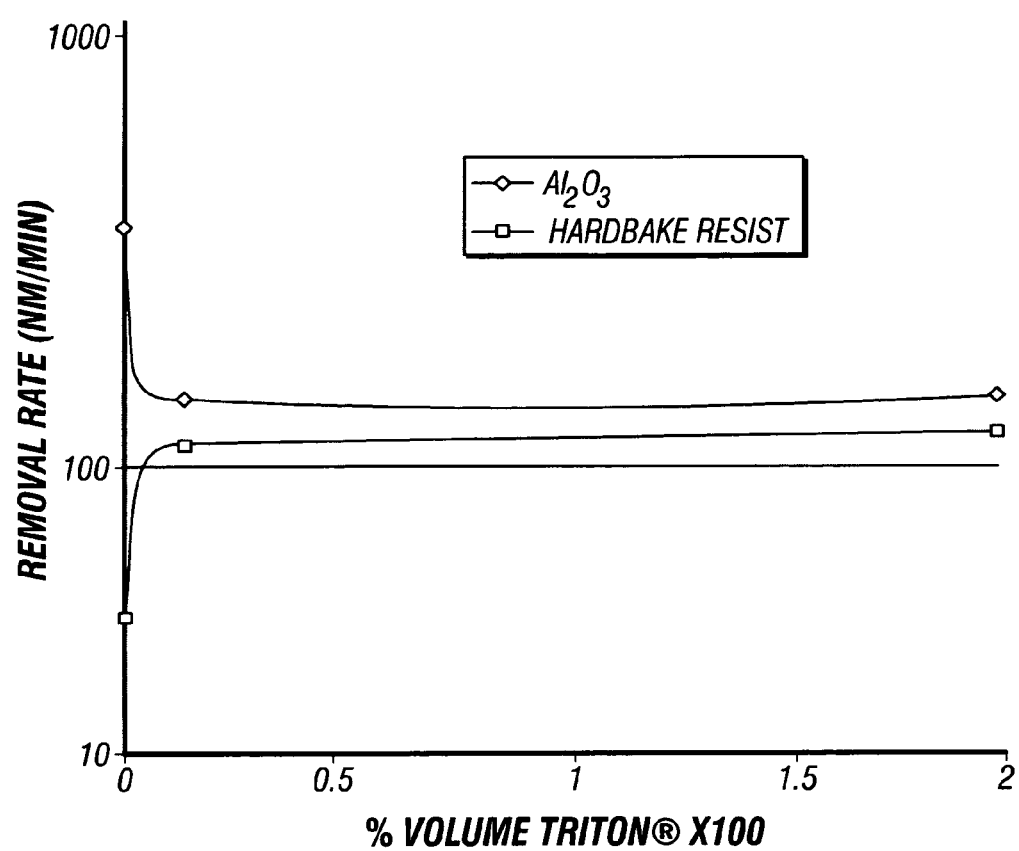
FIG. 5 is a graph showing hardbaked resist and alumina removal rates based on the percentage (by volume) of surfactant present in a CMP slurry made according to the invention.

The addition of TRITON® X100 surfactant to a water/silica-based CMP slurry has been found to improve equalization of the CMP planarization rates of copper, hardbaked resist, alumina and NiFe materials by increasing the hardbaked resist removal rate relative to that of alumina. The data illustrated in FIG. 5 report blanket wafer removal rates of alumina and hardbaked resist (Y axis) using an abrasive CMP slurry containing water, about 9% (by volume) silica abrasive, and about 2 grams/liter ammonium persulfate, and increasing percentages (by volume) of added TRITON® X100 surfactant (X axis). Without the surfactant, the hardbaked resist removal rate is approximately 90% slower than the alumina removal rate under the same polishing conditions using a conventional Strasbaugh model 6DS-SP CMP tool (5 psi down force, 40 rpm spindle speed and 45 rpm table speed). With the addition of about 0.1% (by volume) of the surfactant, the hardbaked resist removal rate increases substantially. At about 0.2% (by volume) of the surfactant, the hardbaked resist removal rate is only about 29% slower than the alumina removal rate under the same polishing conditions. Above about 0.5% (by volume) of added surfactant, the hardbaked resist removal rate does not measurably increase.

Following are two examples that illustrate the effectiveness of using a surfactant-enhanced CMP slurry to promote the simultaneous planarization of copper, hardbaked resist, alumina and NiFe structures. Example 1 below shows the results of CMP planarization using a CMP slurry without surfactant. Example 2 below shows the results of CMP planarization using the same CMP slurry with surfactant added thereto under roughly the same polishing conditions.

EXAMPLE 1

The slurry of this example was based on a commercially available product sold under the name "SC-112" by Cabot Microelectronics, Corporation. As sold, this slurry product comprises water and about 12% (by volume) silica abrasive having a particle size of less than 1000 Angstroms. The abrasive content of the SC-112 slurry was diluted to 9% abrasive content (by volume) by adding an ammonium persulfate/water mixture containing 10 grams/liter ammonium persulfate to produce the desired concentration of about 1.5–3 grams/liter ammonium persulfate in the slurry as a whole. A wafer comprising the structure shown in FIG. 3 was placed on a Strasbaugh model 6DS-SP CMP tool equipped with a standard polishing pad. Note that the hardbaked resist material 28 was hardbaked resist 1529. The polishing conditions were 6 psi down force, 50 rpm spindle speed, 35 rpm table speed and 110 ml/minute slurry flow. Under these conditions, it was observed that the NiFe P2 stubs 34a/34b and the copper coils 26 were exposed after four minutes of polishing time. The planarization results, as measured with a profilometer, are shown by the table below, which sets forth the differences in height of the various materials of the planarized head 20 of FIG. 4.

TABLE 1

| STEP LOCATION | STEP SIZE |
| --- | --- |
| NiFe back gap P2 stub/hardbaked resist | 1000 A |
| NiFe back gap P2 stub/alumina | 350 A |
| Wide pitch copper coils/hardbaked resist | 200–250 A |
| Narrow pitch copper coils/hardbaked resist | 150 A |
| Hardbaked resist/alumina | 200–400 A |

EXAMPLE 2

The slurry of this example was the same as that used in Example 1 except that 0.5% (by volume) of TRITON® X100 surfactant was added. A wafer containing the structure shown in FIG. 3 was placed on a Strasbaugh model 6EC CMP tool (similar to the Strasbaugh model 6DS-SP CMP tool of Example 1) equipped with a standard polishing pad. As in Example 1, the hardbaked resist material 28 was hardbaked resist 1529. The polishing conditions were 6 psi down force, 40 rpm spindle speed, 41 rpm table speed and 110 ml/minute slurry flow. Both the NiFe P2 stubs 34a/34b and the copper coils 26 were exposed after seven minutes forty seconds of polishing time. The planarization results are shown by Table 2 below, which sets forth the differences in height of the various materials of the planarized head 20 of FIG. 4.

TABLE 2

| STEP LOCATION | STEP SIZE |
| --- | --- |
| NiFe back gap P2 stub/hardbaked resist | 1600 A |
| NiFe back gap P2 stub/alumina | 700 A |
| Wide pitch copper coils/hardbaked resist | 150 A |
| Narrow pitch copper coils/hardbaked resist | ~0 |
| Hardbaked resist/alumina | ~0 |

Tables 1 and 2 show that there was a 600 A increase in the step between the NiFe back gap P2 stub 34a and nearby hardbaked resist material 28. There was also a 350 A increase in the step between the NiFe back gap P2 stub 34a and nearby material of the first alumina layer 30. These increases are attributable to the differences in spindle speed and table speed, and may be readily overcome by adjusting those mechanical parameters. Of more significance is the fact that the step between the wide pitch copper coils 26a and the adjacent hardbaked resist material 28 dropped by 50–100 A, and the step between the narrow pitch copper coils 26b and the adjacent hardbaked resist material 28 dropped 150 A to zero. In addition, the step between the hardbaked resist material 28 and the first alumina layer 30 dropped 200–400 A to zero. These steps were not heretofore reducible to any significant degree by mechanical adjustments alone.

Figure 6:
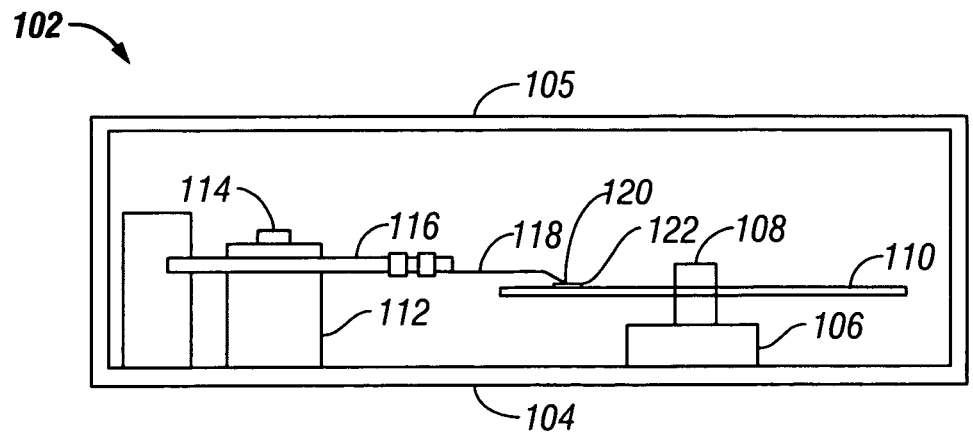
FIG. 6 is a simplified vertical sectional view of a magnetic disk drive that incorporates a write head made according the present invention.
Figure 7:
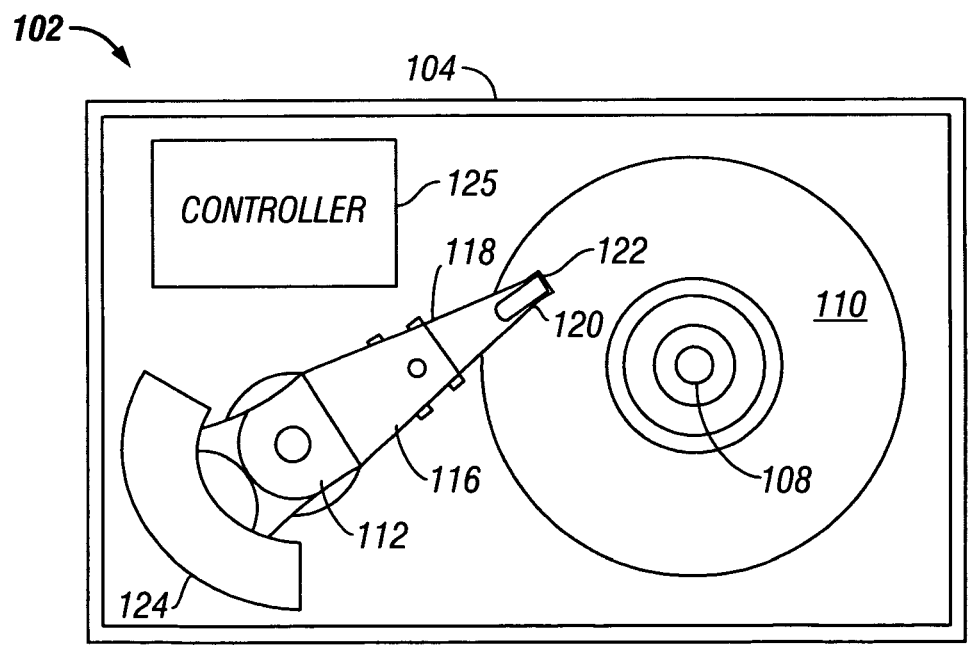
FIG. 7 is a simplified horizontal sectional view of the disk drive of FIG. 6.

Turning now to FIGS. 6 and 7, a disk drive 102 includes a write head constructed using the above-described CMP planarization process. The disk drive 102 conventionally includes a base casting 104 made from cast aluminum or other suitable material. A cover 105 is removably mounted thereto via a hermetic seal (not shown). The base casting 104 supports a conventional spindle drive motor 106 having an associated drive spindle 108. The drive spindle 108 carries a disk 110 for high speed rotation therewith. Other disks (not shown) may also be carried on the drive spindle 108 to form a spaced vertically stacked disk platter arrangement. The disk 110 is made from a suitable material of a type usually found in magnetic disk drive assemblies. In particular, the disk 110 is formed from a suitable disk substrate with appropriate coatings being applied thereto such that at least one, and preferably both, of the upper and lower surfaces of the disk are magnetically encodable and aerodynamically configured for high speed interaction with a read/write transducer (described below).

Data access to the disk 110 is achieved with the aid of an actuator 112 that is mounted for rotation about a stationary pivot shaft 114. The actuator 112 includes a rigid actuator arm 116 that carries a flexible suspension 118. The suspension 118 in turn carries a slider 120 that mounts a transducer 122. The transducer 122 is an integrated read/write head that includes a CMP planarized write head and a read head that may incorporate a conventional magnetoresistive sensor. The actuator 112, which is conventionally driven by a voice coil motor 124, moves the slider 120 generally radially across the surface of the disk 110 so that the transducer 122 is able to trace concentric data tracks on the disk.

Data recorded on the disk 110 is read by the transducer 122 and processed into a readback signal by signal amplification and processing circuitry (not shown) that is conventionally located on the actuator arm 116. The readback signal, which carries both data and transducer position control information, is sent to the drive controller 125 for conventional processing.

It will be appreciated that the foregoing detailed description of the disk drive 102 and the transducer 122 is exemplary in nature, and that many other design configurations would be possible while still incorporating a write head that has been CMP planarized according to the invention. For example, the disk drive 102 may include a large number of disks and actuators, and each actuator may carry plural suspensions and multiple sliders. Moreover, instead of using an air bearing slider, an alternative transducer carrying structure may be used that maintains the transducer 122 in contact or near contact with the disk 110.

Accordingly, method for CMP planarization of a magnetic write head has been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a disk drive having a housing, a rotatable magnetic recording medium in the housing, an actuator carrying an actuator arm, a suspension, and a read/write head disposed in adjacent relationship with the recording medium, an improved magnetic write head having a hardbaked resist structure and one or more additional structures containing other materials having comparatively higher surface energy, said structures having a substantially even surface profile in which a surface height differential between said hardbaked resist structure and at least one of said one or more additional structures is less than 150 angstroms as a result of being simultaneously planarized according to a planarization process comprising:

preparing a chemical mechanical polishing (CMP) slurry targeted at equaling the rate of removal of said hardbaked resist structure having relatively low surface energy and said one or more additional structures containing other materials of comparatively higher surface energy;

said CMP slurry including a liquid vehicle containing an oxidant and a complexing agent, an abrasive, and a surfactant; and applying said CMP slurry to the surface of said structures and simultaneously planarizing said structures using a CMP planarization technique.

2. A disk drive in accordance with claim 1 wherein said other materials include copper, alumina and NiFe, and wherein said surface height differential of less than 150 angstroms is between said hardbaked resist structure and a structure comprising copper coil material.

3. A disk drive in accordance with claim 1 wherein said surfactant comprises a non-ionic surfactant.

4. A disk drive in accordance with claim 1 wherein said surfactant comprises octylphenoxypolyethoxyethanol.

5. A disk drive in accordance with claim 1 wherein said abrasive comprises silica.

6. A disk drive in accordance with claim 1 wherein said liquid vehicle comprises water, said oxidant and said complexing agent.

7. A disk drive in accordance with claim 1 wherein said oxidant comprises persulfate.

8. A disk drive in accordance with claim 1 wherein said complexing agent comprises ammonium.

9. A disk drive in accordance with claim 1 wherein said slurry comprises about 0.01–1.0% (by volume) of said surfactant.

10. A disk drive in accordance with claim 1 wherein said slurry comprises an aqueous liquid vehicle containing about 6–12% (by volume) of said abrasive, about 1.5–3 grams/liter ammonium persulfate, and about 0.02–1.0% (by volume) of said surfactant.

11. In a disk drive having a housing, a rotatable magnetic recording medium in the housing, an actuator carrying an actuator arm, a suspension, and a read/write head disposed in adjacent relationship with the recording medium, an improved magnetic write head having a hardbaked resist structure and one or more additional structures containing other materials having comparatively higher surface energy, said structures having a substantially even surface profile in which a surface height differential between said hardbaked resist structure and at least one of said one or more additional structures is less than 150 angstroms as a result of being simultaneously planarized according to a planarization process comprising:

simultaneously planarizing said structures using a chemical mechanical polishing planarization technique and a CMP slurry targeted at equaling the rate of removal of said hardbaked resist structure having relatively low surface energy and said one or more additional structures containing other materials of comparatively higher surface energy; and said CMP slurry including a liquid vehicle, an abrasive, and a surfactant.

12. A disk drive in accordance with claim 11 wherein said other materials include copper, alumina and NiFe, and wherein said surface height differential of less than 150 angstroms is between said hardbaked resist structure and a structure comprising copper coil material.

13. A disk drive in accordance with claim 11 wherein said surfactant comprises a non-ionic surfactant.

14. A disk drive in accordance with claim 11 wherein said surfactant comprises octylphenoxypolyethoxyethanol.

15. A disk drive in accordance with claim 11 wherein said liquid vehicle comprises water, said oxidant and said complexing agent.

16. A disk drive in accordance with claim 11 wherein said oxidant comprises persulfate.

17. A disk drive in accordance with claim 11 wherein said complexing agent comprises ammonium.

18. A disk drive in accordance with claim 11 wherein said slurry comprises about 0.01–1.0% (by volume) of said surfactant.

19. A disk drive in accordance with claim 11 wherein said slurry comprises an aqueous liquid vehicle containing about 6–12% (by volume) of said abrasive, about 1.5–3 grams/liter ammonium persulfate diluted in water, and about 0.02–1.0% (by volume) of said surfactant.

20. In a disk drive having a housing, a rotatable magnetic recording medium in the housing, an actuator carrying an actuator arm, a suspension, and a read/write head disposed in adjacent relationship with the recording medium, an improved magnetic write head having a hardbaked resist structure and one or more additional structures containing other materials having comparatively higher surface energy, said structures having a substantially even surface profile in which a surface height differential between said hardbaked resist structure and at least one of said one or more additional structures is approximately zero angstroms as a result of being simultaneously planarized according to a planarization process comprising:

simultaneously planarizing said structures using a chemical mechanical polishing planarization technique and a CMP slurry targeted at equaling the rate of removal of said hardbaked resist structure having relatively low surface energy and said one or more additional structures containing other materials of comparatively higher surface energy; and said CMP slurry including a liquid vehicle, an abrasive, and a surfactant.

* * * * *